United States Patent [19]

Mossalgue

[11] Patent Number: 4,807,329
[45] Date of Patent: Feb. 28, 1989

[54] DETACHABLE HINGE, PARTICULARLY FOR ARTICULATING A LID ON A BOX BODY

[76] Inventor: François Mossalgue, 39, rue Emile Roux 94120, Fontenay sous Bois, France

[21] Appl. No.: 126,772

[22] Filed: Nov. 30, 1987

[51] Int. Cl.$^4$ ............................................... E05D 7/10
[52] U.S. Cl. ...................................... 16/262; 16/263; 16/265; 16/270; 16/386; 16/DIG. 13
[58] Field of Search ................ 16/225, 261, 262, 263, 16/265, 270, 386, DIG. 13; 403/11

[56] References Cited
U.S. PATENT DOCUMENTS
2,933,016 4/1960 Kunde ................................... 16/228

FOREIGN PATENT DOCUMENTS
1285913 12/1968 Fed. Rep. of Germany ........ 16/470
1145806 10/1957 France ................................. 16/265

Primary Examiner—Nicholas P. Godici
Assistant Examiner—Edward A. Brown
Attorney, Agent, or Firm—Kinzer, Plyer, Dorn, McEachran & Jambor

[57] ABSTRACT

The invention relates to a detachable hinge for articulating a first element and a second element, particularly to provide a fisherman's creel/seat.

This hinge is characterized in that it consists of a main flap (5), an auxiliary flap (9), a removable connecting member (11) as well as means (12, 13, 8, $7_1$, $7_2$) which make it possible to displace the connecting member (11) between a locking position in which the flap (9) is capable of pivoting about the flap (5) and a free position, the flaps (9,5) being independent of each other.

10 Claims, 4 Drawing Sheets

DETACHABLE HINGE, PARTICULARLY FOR ARTICULATING A LID ON A BOX BODY

The present invention relates to a detachable hinge for articulating a first element and a second element, particularly for hinging a lid on a box body.

This hinge is more particularly intended for a fisherman's creel/seat comprising a plurality of superposed box bodies.

When practising their favourite sport, fishermen are accustomed to sitting on seats of trapezoidal shape consisting of the superposition of a plurality of compartments which serve to contain the items which are essential to them (fish hooks, weights, lines, bait, reels . . . ).

More often than not, these creel/seats consist of wooden elements connected by conventional hinges; in no way can they be dismantled so that they can meet requirements and are relatively awkward both to produce and also to store.

The object of the present invention is to remedy these drawbacks by proposing a disconnectable or detachable hinge of a novel type which is more particularly adapted to fishermen's creel/seats.

According to the invention, this hinge is characterized in that it is constituted by a principal flap connected to the first element, an auxiliary flap connected to the second element, a removable connecting member intended to connect the first and second elements and also means permitting displacement of the connecting member between a first position or locking position in which the auxiliary flap is able to pivot about the main flap and the connecting member and a second position or free position in which the auxiliary flap and the main flap are independent of each other.

Of course, this hinge may be used in a field entirely different from that of fishermen's creel/seats without thereby departing from the scope of the invention.

One might, for example, envisage equipping tool boxes with such hinges.

According to another characteristic feature of the invention, the connecting member comprises hooking means adapted to maintain it integral with the main flap in the free position.

In the most frequent situation, and according to another characteristic feature of the invention, the means which make it possible to displace the connecting member consist of at least one fixing rod which has no symmetry of revolution and which is adapted to slide in at least one aperture provided for longitudinal support and provided in the main flap for this purpose.

Generally, the fixing rods are two in number and are constituted by parallel and preferably metallic elements adapted to be introduced with force into two corresponding cylindrical bores in the main flap.

In the most frequent situation, in which the connecting member consists of an element which consists of a plastics material, it is possible directly to position the fixing rods in the mould which is used for producing these element, in which they are automatically fixed.

It has been possible to establish that it is worthwhile using two parallel cylindrical fixing rods rather than a single rod of oval cross-section.

According to another characteristic feature of the invention, the connecting member comprises a third rod or hinge pin of a length which is less than that of the fixing rods, which is parallel with the latter and which co-operates with an opening in the auxiliary flap or a hinging aperture.

This hinge pin allows the secod element to rotate in relation to the first element.

According to another feature of the invention, the hooking means consist of two parallel grooves formed on the outer surface of the main lug and defining two catches for a flexible bar integral with the connecting member, the said catches corresponding respectively to the locking and free positions of the connecting member.

This configuration makes it possible always to maintain the fixing rods in the retaining aperture in the main flap and consequently to avoid any inopportune loss of the connecting member.

According to another characteristic feature of the invention, the connecting member has on its outer surface a projection to facilitate handling.

In fact, this projection acts as an abutment for the user's finger when he wishes to move the connecting member from the locking position to the free position or vice versa.

The essential characteristic feature of the hinge described hereinabove is linked with its demountable nature and its case of manipulation.

The invention likewise relates to a box, particularly to an element of a fishermen's creel/seat comprising a lid constituting the second element which closes a cubic or parallelepiped box body which constitutes the second element.

According to the invention, this box is characterized in that the box body has at each of its corners a detachable hinge such as that which has been described hereinabove, the main flap of these hinges consisting of an angled member while the apertures which support these angled members face each other in pairs, respectively on the two opposite sides of the box body.

As a result of this configuration, the lid of the box body is removable and it may at will be articulated on one or the other of the two parallel faces.

Over and above its intended purpose, each of the hinges on the box acts at the same time as a round or flat bolt preventing unintended opening of the lid and furthermore as an abutment on which it is possible for the lid to bear when it is open.

Of course, according to the invention, the box body comprises a bottom as well as four lateral sides; according to another characteristic feature of the invention, these lateral sides consist of metal profiled sections, particularly of U-shaped cross-section, comprising at each of their ends a notch intended to fit into grooves provided for the purposes on the inside face of the angled members in such a way as to permit assembly of the whole.

In accordance with this configuration which is adapted substantially to facilitate manufacture of the box, the angled members of the hinges have a fourth role corresponding to assembly of the U-shaped profiled sections.

By reason of this configuration, the box according to the invention can be manufactured at a very low cost.

The invention likewise relates to a modular box constituted by the superposition of at least two of the above-described box bodies, each of these box bodies acting as a second element (or lid) for the box body which is situated immediately beneath it.

According to the invention, such a modular box is characterised in that the angled members of each box body comprise in their lower part an additional aperture parallel with the support aperture and acting as an articulating aperture for the box body which is situated immediately below it.

Thus it is possible to arrive at a completely demountable modular box which can comprise any number of superposed box bodies, in view of the fact that these are all identical, the only compulsion being that a lid must be associated with the topmost box body.

This arrangement makes it possible largely to facilitate the storage of modular boxes.

The invention likewise relates to a fisherman's creel/seat comprising a lower compartment in the upper part of which there is fitted a modular box such as has been described hereinabove and of which the lid constitutes the seat for the fisherman.

According to the invention, such a creel/seat for a fisherman is characterised in that the lower compartment is constituted by a main part, particularly of deep-drawn metal plate of approximately square or rectangular cross-section, provided at the top with a frame consisting of metal sections, particularly of U-shaped cross-section, similar to that of the box bodies of the modular box and comprising at each of their ends a notch intended to engage grooves provided for the purpose on the inside face of the angled members of detachable hinges such as the hinges described hereinabove, the metal profiled sections comprising on their lower periphery a metal flange by which they can be assembled together with the main part, particularly by means of positioning bolts.

The part of these bolts which projects towards the inside of the lower compartment may, according to the invention, be used to serve as a support for a removable tray which can also contain various elements such as fish hooks, bait . . .

The creel/seat according to the invention is thus completely demountable and can comprise any desired number of box bodies.

Thus the invention makes it possible largely to facilitate the manufacture and storage of fishermen's creel/seats.

The characteristic features of the hinge, of the box and of the creel/seat which are the subject of the invention will be described in greater detail with reference to the attached drawings, in which.

Figure 1A:
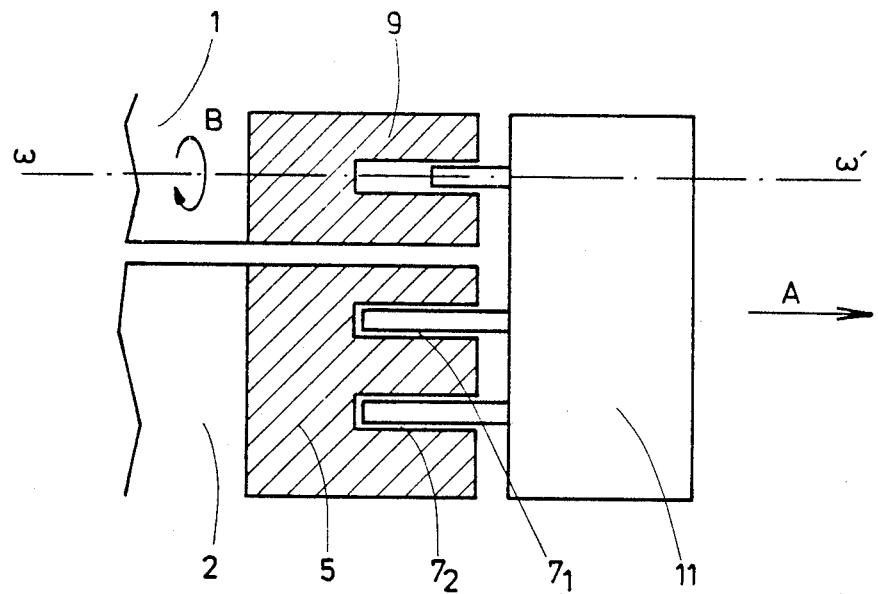
FIGS. 1a and 1b are diagrammatic sections which show the various constituent elements of the hinge according to the invention, respectively in the locking position and in the free position.
Figure 1B:
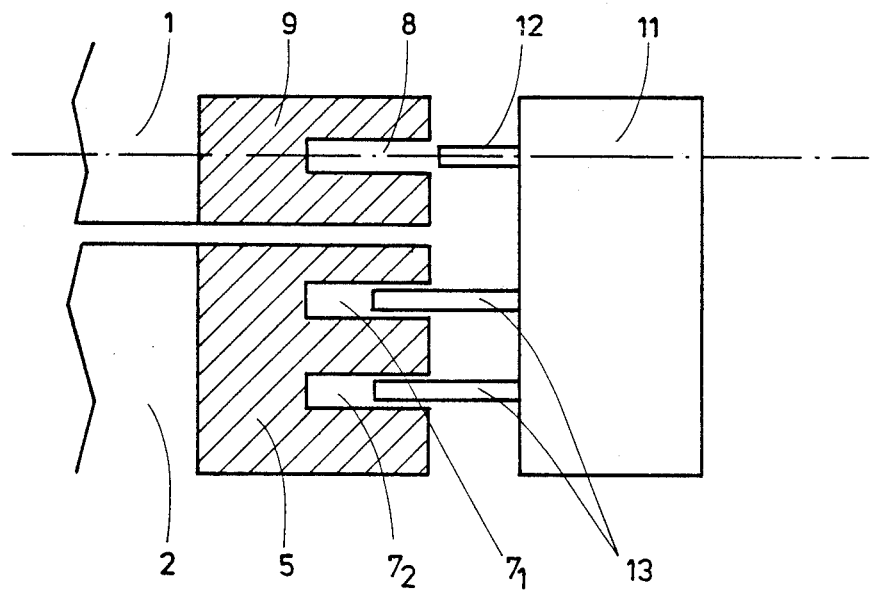

According to FIGS. 1a and 1b, the hinge which is the object of the invention is intended to permit of articulation on a first element 2, particularly a box body, of a second element 1, which is in particular a lid.

According to those drawings, this hinge consists of a main flap 5 connected to the first element 2 of an auxiliary flap 9 connected to the second element 1 and a removable connecting member 11 adapted to connect the main flap 5 to the auxiliary flap 9 and hence the first and second element, allowing this latter freedom to rotate about an axis w—w'.

According to the invention, the hinge likewise comprises means which make it possible to move the connecting member 11 between a first position or locking position shown in FIG. 1a and in which the main flap 5 co-operates with the auxiliary flap 9 and a second position or free position shown in FIG. 1b and in which the main flap 5 and the auxiliary flap 9 and hence the elements 1 and 2 are independent one of the other.

According to these drawings, the connecting member 11 is provided on the one hand with two fixing rods 13 adapted to be introduced with force into two longitudinal supporting apertures $7_1$ and $7_2$ in the main flap 5 and on the other a hinge pin 12 adapted to be introduced with force into an articulating aperture 8 in the auxiliary flap 9.

The connecting member 11 is generally of plastics material, while the rods 12 and 13 consist of metallic cylindrical bodies directly placed in the mould for producing the connecting member 11.

On the other hand, the apertures 8, $7_1$, $7_2$ are of identical dimensions and are parallel and coplanar; the hinge pin 12 is shorter in length than the fixing rods 13 so that, as from the locking position shown in FIG. 1a in which the auxiliary flap 9 and hence the second element 1 are maintained integral with the main flap 5 and the first element 2 while being capable of rotating freely about the axis w—w' according to the arrow B, it is possible by manually exerting traction according to the arrow A on the connecting member 11, to bring this latter into the free position shown in FIG. 1b; in this position, the hinge pin 12 is completely out of the articulating aperture 8 and therefore the flaps 5 and 9 and the elements 1 and 2 are completely independent of each other but the fixing flaps 13 remain in support apertures $7_1$ and $7_2$ and therefore the connecting member 11 is always integral with the main flap 5.

Figure 2:
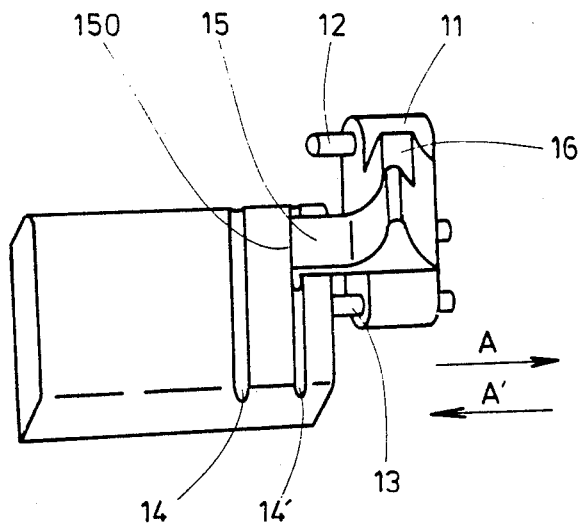
FIG. 2 represents a particularly advantageous embodiment of this hinge.

According to FIG. 2, and in order to prevent any inopportune emergence of the connecting member 11 from the main flap 5 beyond the position shown in FIG. 1b, the member 11 has on its outer surface an elastic or flexible bar 15 adapted to fit into grooves 14 and 14' provided on the outer surface of the main flap 5 in such a way as to define two catches corresponding to the two different positions of the connecting member 11 as shown in FIGS. 1a and 1b.

If one considers FIGS. 1a, 1b and 2 simultaneously, it is evident that when the end 150 of the resilient bar 15 is locked in the inner notch 14, the connecting member 11 is in the articulating position shown in FIG. 1a, in which the hinge pin 12 acts as a hinge; in contrast, when this end 150 is locked in the catch 14', the rod 12 is clear of the auxiliary flap 9 and the connecting member 11 is in the free position shown in FIG. 1b.

As has already been indicated, in order to move the connecting member from the position shown in FIG. 1a to the position shown in FIG. 1b or vice versa, it is sufficient to exert thereon a traction represented by the arrows A and A' in FIG. 2. To facilitate this movement, there is provided on the upper face of the member 11 a projection 16 which serves as a support particularly for the user's thumb.

Hereinafter, to maintain clarity of the drawings, the resilient bar 15 will not be shown; it is of course preferable to provide it in order to avoid any loss of the connecting member 11.

On the other hand, the presence of two support apertures $7_1$ and $7_2$ co-operating with two fixing rods 13 of the connecting member 11 is absolutely vital to avoid any rotation of these elements in respect of each other when the hinge pin 12 acts as a hinging spindle between the first element 2 and the second element 1.

According to FIG. 5, four hinges of the type described hereinabove are intended to allow articulation of a lid 1 (representing the second element) on a box body 2 (constituting the first element), provided with a bottom 3 and four lateral faces positioned at a right-angle, 4.

In accordance with this configuration, each of the main flaps of the hinges consists of an angled member 5, particularly of plastics material, fixed at the level of the intersection of two perpendicular lateral faces 4 and 4' in a manner which will be described in greater detail hereinafter in this description.

Each of these angled members 5 is provided on one of its lateral edges with three apertures $7_1$, $7_2$, $7_3$. The apertures $7_1$ and $7_2$ correspond to the above-mentioned support apertures; the purpose of the aperture $7_3$ will also be described in greater detail hereinafter in this description.

Furthermore, each of the auxiliary flaps 9 of the hinges consists of a flat element secured particularly by means of screws to the lower part 10 of the lid 1 and curved over at its outer part to define the articulating aperture 8; according to this configuration, it is of course necessary that when the lid 1 is folded back onto the box body 2, the flap 9 is situated above the support orifice of the angled member 5 which constitutes the main flap associated with it.

Figure 5:
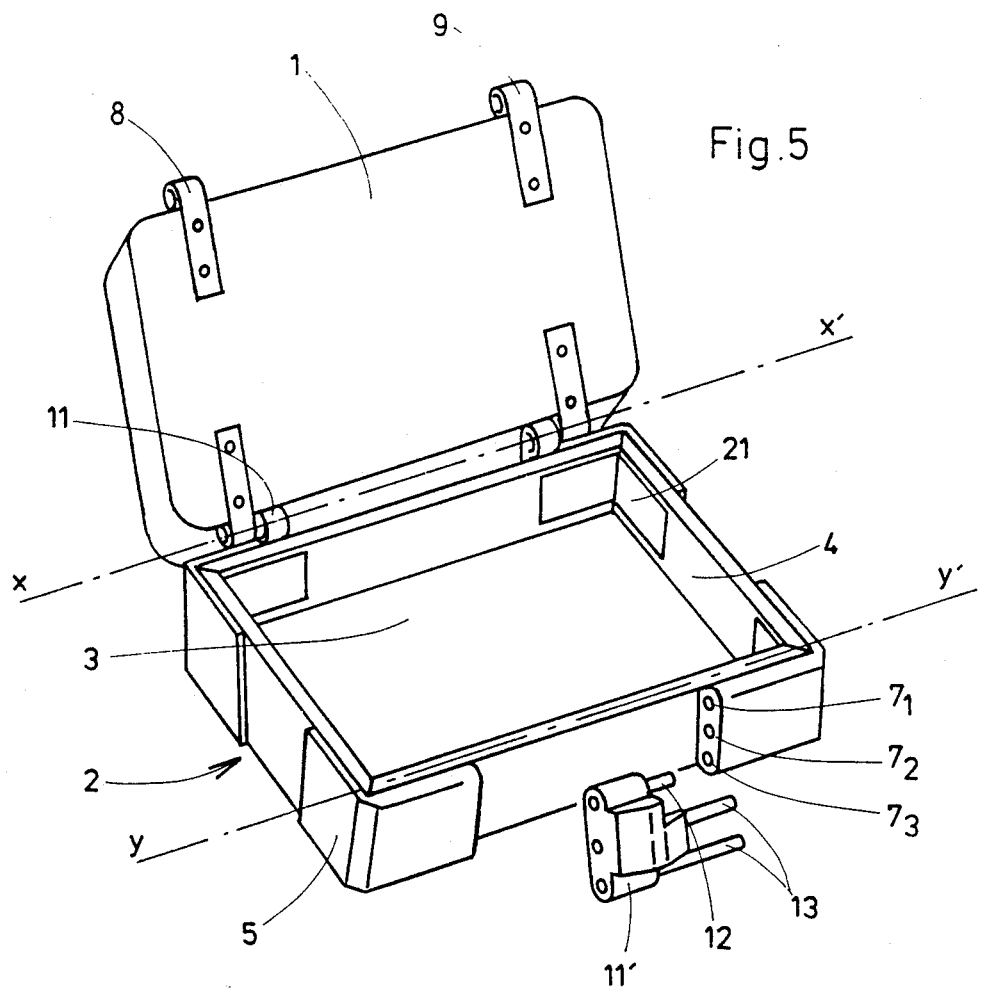
FIG. 5 is a perspective view of a box according to the invention.

According to FIG. 5, the lid 1 is articulated on the box body 2 by the hinges placed on its rear faces, that is to say according to the rear axis x—x'; of course, it could equally well be articulated according to the front axis y—y', or also it would be possible for the lid to be entirely separate from the box body.

Figure 3:
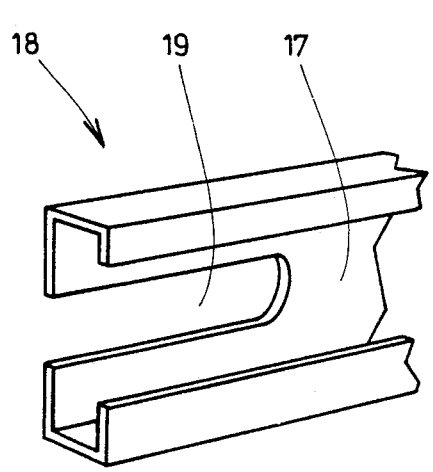
FIG. 3 is a detail showing the end of a profiled section constituting the lateral faces of a box body according to the invention.
Figure 4:
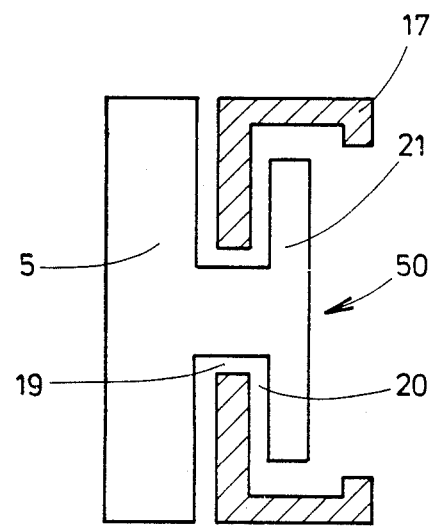
FIG. 4 shows the way the profiled sections fit into the angled sections.

According to FIGS. 3, 4 and 5, the lateral faces 4 of the box body 2 which surround the bottom 3 consist of U-shaped sectional metal members 17 (shown in FIG. 3) which comprise at each of their ends 18 a longitudinal notch 19 which makes it possible for the various lateral faces and the four angled members 5 to be assembled in a squared relationship; indeed, and as shown more precisely in FIG. 4, these latter are provided on their rear face 50 with longitudinal grooves 20 defined by a bead 21 and intended to fit into the notches 19.

Therefore, assembling the lateral faces 4 is extremely simple.

FIG. 5 diagrammatically shows each of the angled members 5 mounted on each of the corners of the box body 2 but to simplify the drawings, the connecting members 11 associated with the front face y—y' have not been shown.

On the other hand, a connecting member 11' comprising two fixing rods 13 of considerable length and a rod 12 of shorter length have been shown; the object of this is to allow positioning underneath the box body 2 of another box body 2' which is exactly similar but which is not shown, for which the box body 2 would act as a second element (lid); to allow such a superposed relationship, each angled member 5 is provided on one of its edges with a third aperture $7_3$ identical to the support apertures $7_1$ and $7_2$ and placed underneath. Indeed, the aperture $7_3$ constitutes the locking aperture (similar to the aperture 8) of the box body which is placed beneath the box body 2.

Thus, according to the invention, it is possible to superpose any number of identical box bodies 2 by articulating them either on their front face y—y' or on their rear face x'x'.

Figure 6:
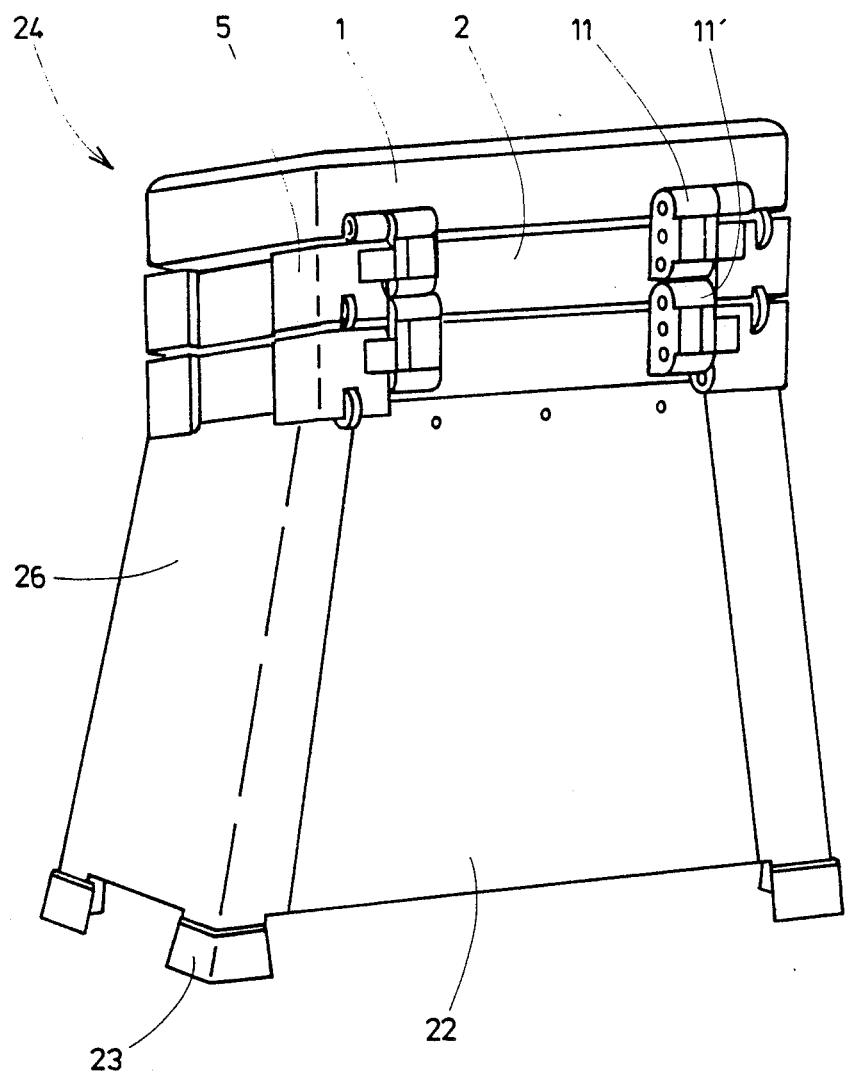
FIG. 6 is a perspective view of a fisherman's creel/seat according to the invention.

FIG. 6 shows, a fisherman's creel/seat which is a direct application of the boxes shown in FIG. 5.

This creel/seat consists of a lower compartment made from deep-drawn metal plate 22 resting on feet 23 and in the upper part of which there is fitted a box such as is shown in FIG. 5 and which consists of a lid 1 constituting the fisherman's seat which is hinged on a box body 2 by means of hinges such as are described herinabove with reference to FIGS. 1 to 5.

FIG. 6 shows an embodiment which comprises only a single box body 2. Of course, the number of superposed box bodies may be any desired number without thereby departing from the scope of the invention.

Figure 7:
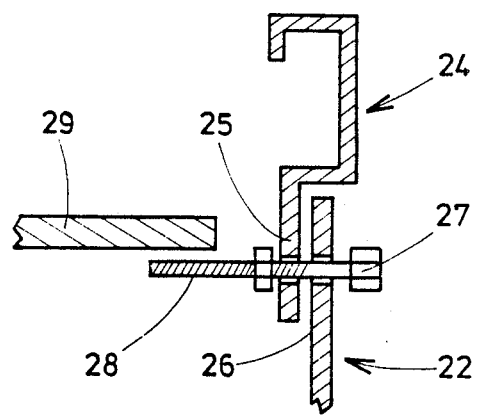
FIG. 7 is a sectional view at the level of the upper part of the lower compartment of the creel/seat.

According to FIGS. 6 and 7, the lower compartment 22 comprises a main part 26 edged at the top by a frame 24 of the same dimensions as the box body 2. According to FIG. 4, this frame 24 consists of profiled sections identical to the profiled section 17 (FIGS. 3 and 4) but comprising on their lower periphery a metal flange 25 by which they can be assembled to the main part 26 of the lower compartment 22, particularly by means of bolts 27 of which the end 28 which passes into the interior of the compartment 22 acts as a support for a tray 29 which can also contain elements such as fish hooks, fishing lines, bait . . .

Consequently, and in accordance with these drawings, the lower compartments can, by virtue of the frame 24, fulfill exactly the same role as the box bodies 2.

I claim:

1. Detachable hinge for articulating a first element and a second element, particularly for articulating a lid (1) on a box body (2), the hinge being more particularly intended for a fisherman's creel/seat comprising a plurality of superposed box bodies (2), characterised in that it consists of a main flap (5) connected to the first element (2), an auxiliary flap (9) connected to the second element (1), a removable connecting member (11) adapted to connect the first and second elements (2, 1) and means (12, 13, 8, $7_1$, $7_2$, $7_3$) permitting the displacement of the connecting member (11) between a first position or locking position in which the auxiliary flap (9) is adapted to pivot about the main flap (5) and the connecting member (11) and a second position or free position in which the auxiliary flap (9) and the main flap (5) are independent of each other.

2. Hinge according to claim 1, characterised in that the connecting member (11) comprises a resilient bar (15) adapted to maintain it rigid with the main flap (5) in the free position.

3. Hinge according to claim 2, characterised in that the means which permits the displacement of the connecting member consists of at least one rod (13) which has no symmetry of revolution and which is adapted to slide it at least one longitudinal support aperture ($7_1$, $7_2$) provided for the purpose in the main flap (5).

4. Hinge according to claim 3, characterised in that the support aperture ($7_1$, $7_2$) consists of two parallel cylindrical bores co-operating with two rods (13) of the connecting member (11) or fixing rod.

5. Hinge according to claim 4, characterised in that the connecting member (11) comprises a third rod (12) or hinge pin of a length less than that of the fixing rods (13) parallel with these latter and co-operating with an aperture (8) in the auxiliary flap (9) or articulating aperture.

6. Hinge according to claim 2, characterised in that the backing means consist of two parallel grooves (14, 14') traced on the outer surface of the main flap (5) and defining two catches for said resilient bar (15) integral with the connecting member (11), the said catches corresponding respectively to the locking and free positions of the connecting member (11).

7. Box, particularly a fisherman's creel/seal element, comprising a lid (1) constituting the second element closing a cubic or parallelepiped box body constituting the first element, characterised in that the box body (2) is provided at each of its corners with a detachable hinge,
the main flap (5) of these hinges consisting of an angled member and the support apertures ($7_1$, $7_2$) of these angled members being oppositely paired on two opposite sides (x, x'; y, y') of the box body (2).

8. Box according to claim 7 in which the box body comprises a bottom (3) and four lateral faces (4) characterised in that the lateral faces (4) consist of metal profiled sections (17) particularly of U-shaped cross-section, comprising at each of their ends a notch (19) intended to engage grooves (20) provided in members (5) in such a way as to allow assembly of the whole.

9. Modular box constituted by the superposition of at least two box bodies (2, 2') according to claim 8, surmounted by a lid (1), each of the box bodies (2, 2') acting as the second element for the box body disposed immediately below it, said modular box characterised in that the angled members of each box body comprise at their lower part an additional aperture ($7_3$) parallel with the support aperture ($7_1$, $7_2$) and acting as an articulating aperture for the box body which is located immediately below it.

10. A fisherman's creel/seat comprising a lower compartment (22) in the upper part of which there is fitted a modular box according to claim 9, of which the lid (1) constitutes the fisherman's seat, the said creel/seat being characterised in that the lower compartment (22) consists of a main part (26) particularly of deep-drawn sheet metal, of approximately square or rectangular cross-section, bordered at its top edge by a frame (24) consisting of metal profiled sections, particularly of U-shaped cross-section, and comprising at each of their ends a notch (19) adapted to engage grooves (20) provided for the purpose of detachable hinges on the inside face (50) of the angled members, the metal profiled sections comprising on their lower periphery a metal flange (25) by which they can be assembled together with the main part (26), particularly by means of positioning bolts (27).

* * * * *